United States Patent [19]

Lee

[11] Patent Number: 5,414,545
[45] Date of Patent: May 9, 1995

[54] MULTILAYERED LIQUID CRYSTAL DISPLAY WITH MULTIPLE BLACK UNIT COLUMNS

[75] Inventor: Hyung-seok Lee, Seoul, Rep. of Korea

[73] Assignee: Samsung Electronics Co., Ltd., Kyungki, Rep. of Korea

[21] Appl. No.: 170,940

[22] Filed: Dec. 22, 1993

[30] Foreign Application Priority Data

Dec. 26, 1992 [KR] Rep. of Korea .................... 92-25628

[51] Int. Cl.⁶ .................... G02F 1/133; G02F 1/1333; G02F 1/1339
[52] U.S. Cl. ......................................... 359/53; 359/79; 359/81
[58] Field of Search ...................... 359/53, 62, 79, 81, 359/51, 67

[56] References Cited

U.S. PATENT DOCUMENTS

| | | | |
|---|---|---|---|
| 3,886,014 | 5/1975 | Bayer | 156/145 |
| 4,581,608 | 4/1986 | Aftergut et al. | 340/704 |
| 4,659,182 | 4/1987 | Aizawa | 350/339 F |
| 4,813,770 | 3/1989 | Clerc et al. | 350/347 E |
| 4,836,652 | 6/1989 | Oishi et al. | 350/334 |
| 4,878,741 | 11/1989 | Fergason | 350/339 F |
| 5,113,272 | 5/1992 | Reamey | 359/53 |
| 5,138,473 | 8/1992 | Dijon et al. | 359/67 |

FOREIGN PATENT DOCUMENTS

62-196688  2/1989  Japan ...................... 359/53

*Primary Examiner*—Anita Pellman Gross
*Assistant Examiner*—Charles Miller
*Attorney, Agent, or Firm*—Stephen R. Whitt; Robert A. Westerlund; Charles R. Donohoe

[57] ABSTRACT

An improved liquid crystal display device which has a clear contrast and satisfactorily good manufacturing processes, includes a plurality of first electrodes which are placed in a predetermined pattern and determine multiple pixel area and a plurality of second electrodes which are provided to be opposingly placed apart in a predetermined interval therewith; a liquid crystal layer to be filled tip between the electrodes: one or more insulation layers are provided in the liquid crystal layer, for forming multiple liquid crystal layers; columns for fixing the location of the insulation layers in the liquid crystal layer; and a protective insulation layer for protecting the electrodes. In the liquid crystal display device, the columns are made of black-colored materials for absorbing external light and are composed of multiple unit columns sequentially disposed up and down, with the insulation layer inserted therebetween. The columns constituted by the unit columns are located in the area excluding pixel area in which the tipper and lower electrodes cross each other. Accordingly, a separate processing for the columns is not necessary but light-exposing process of a predetermined pattern is only added to form a cavity portion and a column portion during the dissolving process of a dissolution layer at one time.

19 Claims, 10 Drawing Sheets

MULTILAYERED LIQUID CRYSTAL DISPLAY WITH MULTIPLE BLACK UNIT COLUMNS

BACKGROUND OF THE INVENTION

The present invention relates to a liquid crystal display device used in an optical display, and manufacturing method for same. More particularly, the present invention relates to a liquid crystal display (LCD) device, and manufacturing method for same, wherein the LCD device includes a plurality of insulation layers which partitions a liquid crystal layer, and having a column layer which supports the insulating layer in the liquid crystal layer.

An LCD consumes a small amount of electricity because of its low driving voltage. Various new kinds of LCDs have been developed as image display devices, such as plasma display panels and electro-luminescence effect devices, and their application fields have greatly multiplied because of the small lightweight features of the LCD.

Current LCD devices having an active matrix formed from a simple matrix or thin film transistors (TFT) typically use a twisted nematic (TN) type or super twisted nematic (STN) type liquid crystal. Such conventional LCDs, thus, require at least one polarizer, that is, at least one polarized plate to control light flow. Unfortunately, the polarized plate in the conventional LCD intercepts more than 50% of the emitted light while controlling the polarized light. Accordingly, light efficiency in the displayed image is severely curtailed.

Therefore, in order to obtain a picture image having acceptable brightness, conventional LCD image display devices add a particularly bright background light source. Thus, in the case of a laptop wordprocessor or computer which uses a dry cell battery or an accumulative battery as a power supply, extended use is limited due to the excessive power consumption of the background light source.

Conventional image display devices having TN and STN type LCDs are generally characterized by a liquid crystal substance sandwiched between two glass plates. The distance between the two glass plates defines a cell gap which must be strictly and uniformly maintained (or adjusted) since it determines the "light-controlled" region within the LCD device. Due to current technological limitations in the manufacturing of the glass plate, the super-enlargement of a LCD display devices is very hard to achieve.

Therefore, it is necessary to remove the polarized plate in order to increase light efficiency, and to eliminate cell gap adjustment problem. Of course, LCDs which do not use a polarized plate have previously been proposed. Examples of such include the cholesteric nematic transition (CNT) type which uses a phase transition effect, and the dynamic scattering mode (DSM) type which was devised during early LCD development. The DSM type LCD device is no longer commonly used since it exhibits a slow response time and cannot be made thin.

Another example of an LCD not using a polarized plate to increase the light efficiency is the polymer-dispersed liquid crystal display (PDLCD). The PDLCD is made of a polymer material of which more than 50% (by volume) is light-transmitting. Given this property light scattering should be brought about efficiently in order to obtain a clear contrast ratio. There is a structural limitation to attaining this requirement in that the thickness of the liquid crystal layer must be at least 20 $\mu$m.

U.S. patent application Ser. No. 08/058,712 as well as a related continuation-in part filed on Aug. 24, 1993 disclose an improved LCD having an electrical field effect type liquid crystal with a structure which remedies many of the problems in the conventional LCD.

Figure 1:
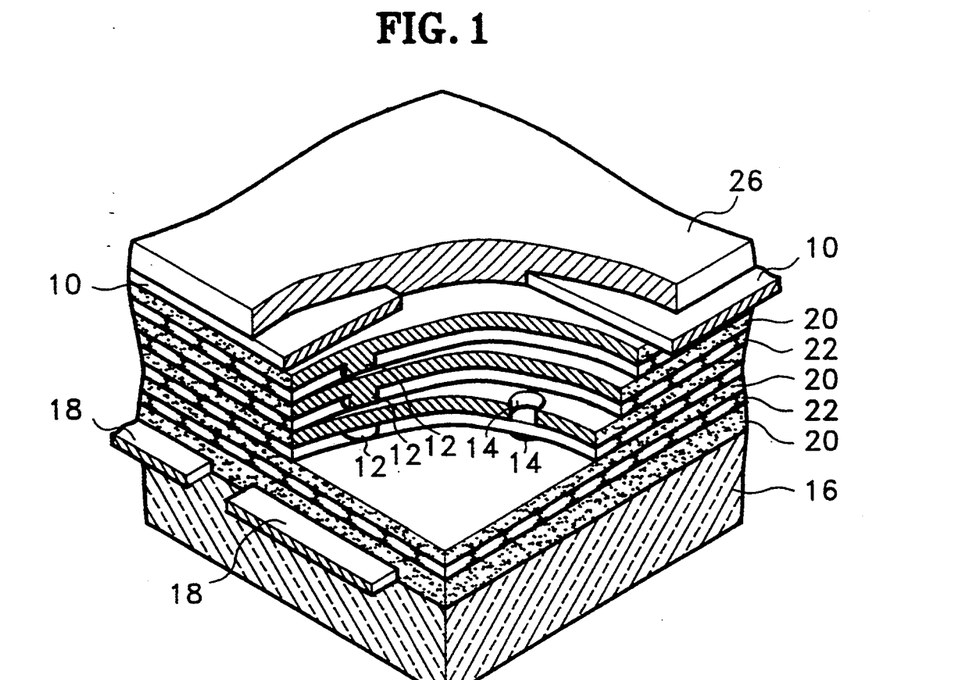
FIG. 1 is a schematic perspective view of a reflective type liquid crystal display device proposed in U.S. patent application Ser. No. 08/058,712.

The foregoing "improved" LCD has a fast driving speed and a high utilization efficiency of light. The improved LCD is characterized by a liquid crystal layer provided between the opposing electrodes and isolated by a plurality of insulation layers to form a multi-layer structure. In this arrangement, a polarized plate is not used. Rather, a single sheet, glass substrate is employed on which a functional layer for controlling light is accumulated. That is, as shown in FIG. 1, an electrical field effect type liquid crystal layer is provided between opposing electrodes 10 and 18. Insulation layers 22 separate this layer into a plurality of liquid crystal layers 22. The distance between liquid crystal layers 20 is maintained by columns 12. The mutual location of insulation layers 22 is fixed by columns 12 which are provided locally. Injection holes 14 used to inject liquid crystal are provided in insulation layers 22. Here, the thickness of each respective liquid crystal layer 20 partitioned from the overall liquid crystal layer is less than or equal to 3 $\mu$m. The thickness of each insulation layer is preferably less than or equal to 5 $\mu$m. Each insulation layer 22 can be made of an epoxy resin material, or a metal oxide, particularly an aluminum oxide.

The new method for manufacturing a liquid crystal display device set forth in the above noted U.S. patent applications is generally limited to the use of a water-soluble polyvinyl alcohol (PVA) as the material forming the dissolution layer which secures an evacuated portion ultimately filled with liquid crystal. Similarly, an epoxy resin is typically used as an insulation layer material. However, a metal such as aluminum can be used instead of the water-soluble PVA and a metal oxide can be used instead of the epoxy resin.

The manufacturing method proposed in the above U.S. patent application is set forth in greater detail below with reference to FIGS. 1 through 9.

Figure 5:
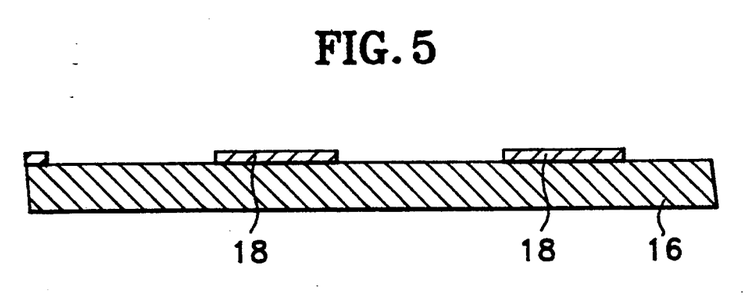
FIGS. 5 through 10 show processing states in sequence throughout the manufacturing steps of the reflective type liquid crystal display device shown in FIG. 1.

In FIG. 5, lower electrodes 18 having a predetermined pattern are formed on a black plastic substrate 16 using a conductive material.

Figure 6:
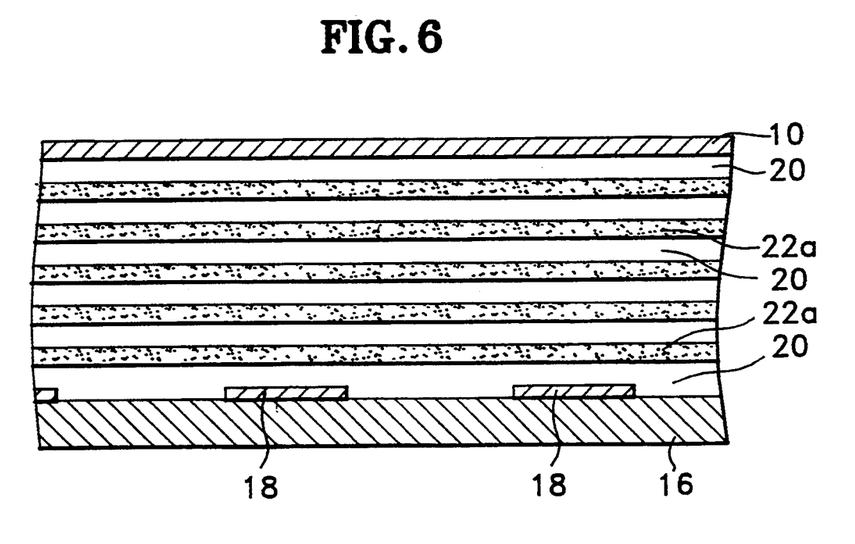

In FIG. 6, the respective layers of epoxy resin layer 20 and PVA layer 22a are alternately laminated a number of times over electrodes 18 of FIG. 5, by a spin coating or roll coating method. Then, an upper electrode 10 of indium tim oxide (ITO) is formed in a predetermined pattern on the uppermost epoxy layer 20.

Figure 7:
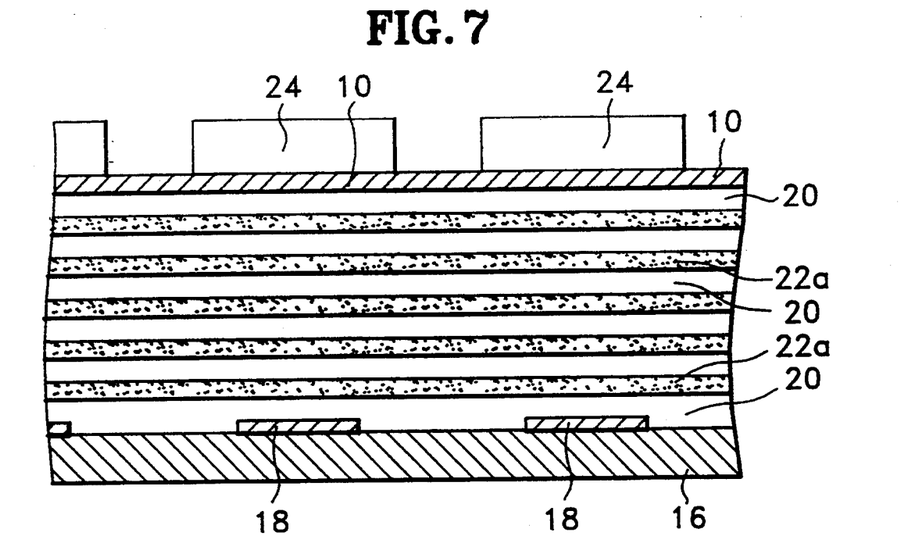

In FIG. 7, a photo mask pattern is formed on upper electrode 10 of FIG. 6 yielding a photoresist 24.

Figure 8:
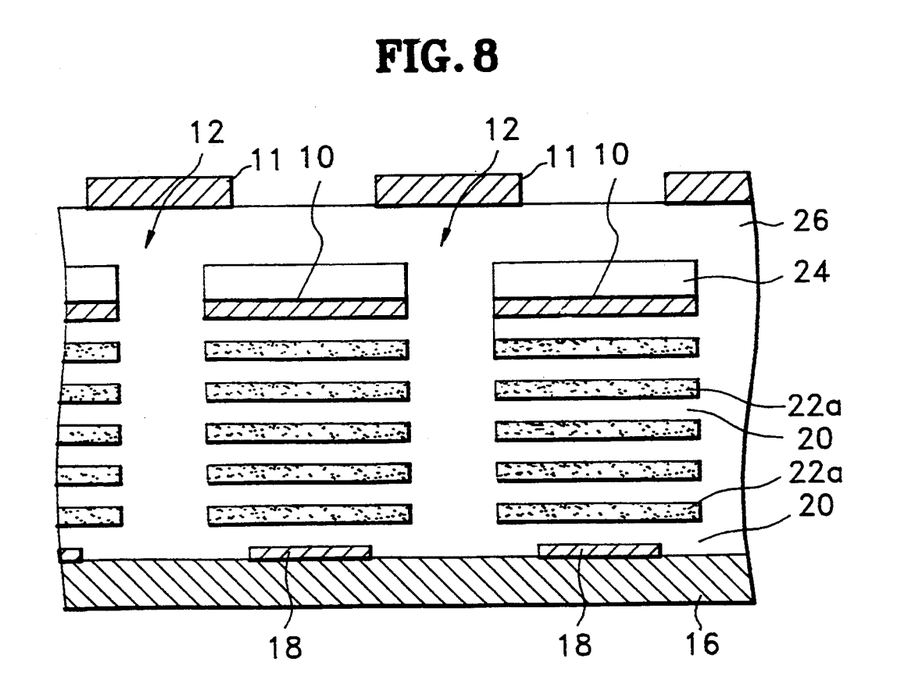

In FIG. 8, the portion of the overall structure not covered by photoresist 24 is plasma-etched to form first inlet holes for columns 12. Then, the first inlet holes are filled with epoxy resin to form columns 12. At the same time, an epoxy resin layer 26 is formed over photoresist 24 and columns 12.

Figure 9:
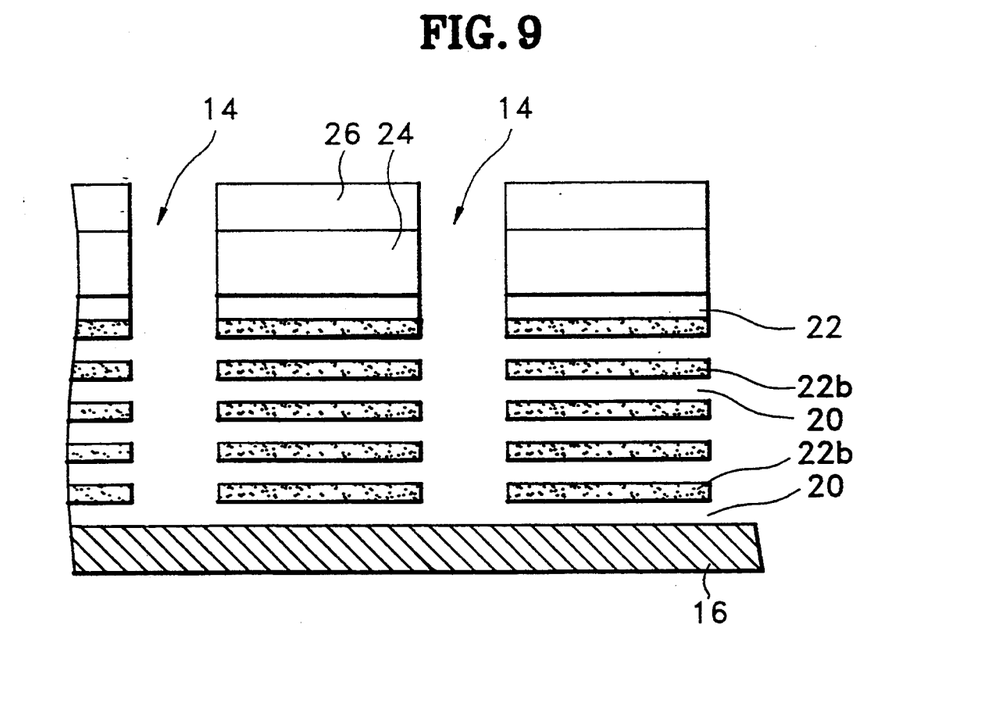

In FIG. 9, second inlet holes 14 for injecting liquid crystal are formed by photo mask patterning and plasma etching. Here, water is injected via inlet holes 14 to thereby dissolve and remove all PVA layers 22a located between epoxy resin layers 20. Accordingly, the dissolution layers connected to second inlet holes 14 are removed, thereby allowing the formation of the evacuated portion to be filled up with liquid crystal. At this time, the vertical separation between respective epoxy resin layers 20 is maintained by columns 12.

Figure 10:
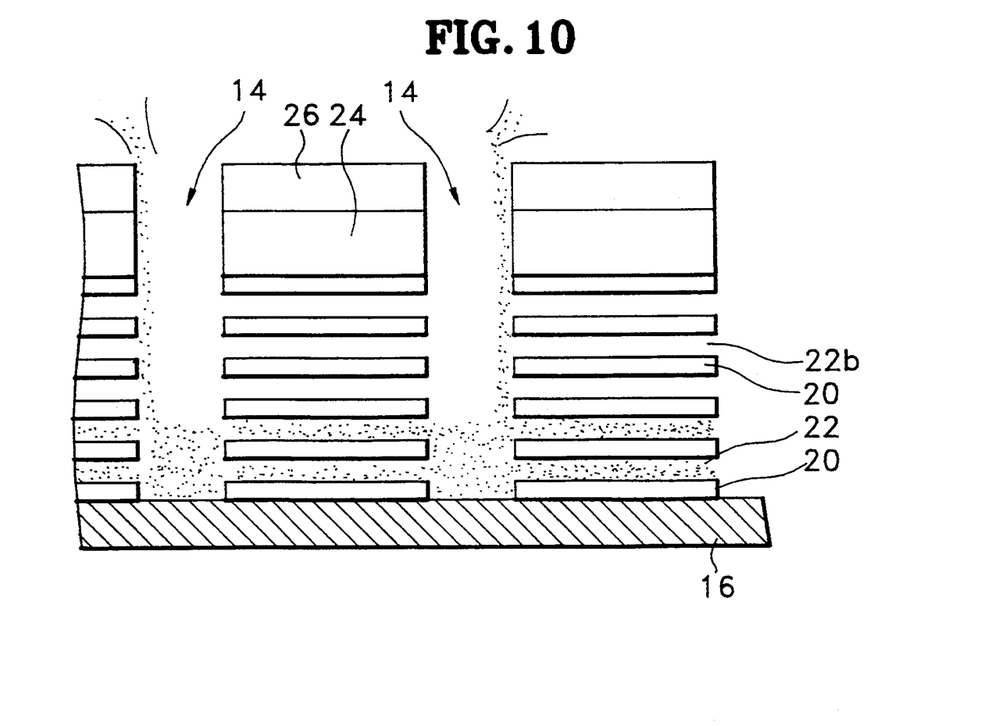

In FIG. 10, after the resultant structure is dried, liquid crystal is injected into the evacuated portion under vacuum through the second inlet holes 14, to form a partitioned liquid crystal layer, actually a plurality of liquid crystal layers 22 located between the epoxy resin layers 20. After the liquid crystal is completely filled, an epoxy resin is coated on the whole surface of the uppermost insulation layer to seal liquid crystal inlet holes 14. Shielding layer 11 is formed directly above each respective column 12 and inlet hole 14 which require light shielding. Accordingly, the reflective-type LCD shown in FIGS. 1 through 4 is accomplished.

In the above manufacturing method, the dissolution layer used to create, or secure, the evacuation region ultimately filled with liquid crystal is typically formed from water-soluble PVA. The insulation layers are typically formed from epoxy resin. However, the materials actually employed need not be limited to these particular examples. A metal such as aluminum can be used instead of the water-soluble PVA, and a metal oxide can be used instead of the epoxy resin.

However, the steps in the foregoing method used to form the are very complicated. Furthermore, other elements in the LCD device structure may be damaged during the etching process. For example, if the dissolution layer is made of a metal and the insulation layer is made of an organic resin, the insulation layer may become cracked due to the large difference between thermal expansion coefficients of the dissolution layer and the insulation layer. In such a case the lowermost insulation layer may become cracked by the heat applied during the manufacturing process. As a result, the first electrode made of indium tin oxide (ITO) may be exposed through the cracks in the lowermost insulation layer. If the ITO electrode is exposed in this manner, it comes into contact with the solvent used to dissolve the dissolution layer. Severe etching of ITO electrode by the solvent may result in an electrical disconnection. Furthermore, while the foregoing liquid crystal display device does have a shielding layer which absorbs external light on the surface of the uppermost portion of the structure, it does not have a separate means for protecting against light interference between internal pixels. As a result, deterioration in overall picture quality occurs due to the light interference between pixels.

SUMMARY OF THE INVENTION

In view of the above problems, it is an object of the present invention to provide a LCD device which can be easily manufactured with fewer performance infirmities. It is further an object of the present invention to provide a LCD device having improved due to decreased light interference between pixels. It is yet another object of the present invention to provide a LCD device which protects the electrode from damage or disconnection during the manufacturing thereof.

To accomplish the above objects, a LCD device according to the present invention comprises: at least one substrate; a plurality of first electrodes disposed in a predetermined pattern on the substrate, for determining multiple pixel areas; a plurality of second electrodes opposingly disposed in a predetermined interval with the first electrodes; a liquid crystal layer to be filled between the opposingly disposed first and second electrodes; one or more insulation layers provided in the liquid crystal layer, for forming multiple liquid crystal layers; columns for fixing the location of the insulation layers in the liquid crystal layer; and a protective insulation layer for protecting the electrodes, wherein the columns are made of a back-colored material for absorbing the external light and are composed of multiple unit columns sequentially placed in the upper and lower portions thereof between each insulation layer, with the insulation layers inserted therebetween, and the columns made of the unit columns are placed in the area excluding the pixel area in which the first and second electrodes intersect.

To accomplish the object of the present invention, the manufacturing method of the liquid crystal display device according to the present invention comprises the steps of:

(1) forming lower electrodes of a predetermined pattern on a substrate;

(2) forming an electrode-protective insulation layer which is not dissolved in a predetermined solvent, on the whole upper surface of the lower electrodes;

(3) forming an intermediate layer separated into dissolution layers and unit columns and obtained by the following steps after forming a photosensitive resin layer which is not dissolved in the predetermined solvent and is dispersed with a black series dye for absorbing light, on the upper surface of the protective insulation layer;

(4) forming a light-transmitting insulation layer on the intermediate layer;

(5) forming multiple laminated layers in which an insulation layer is provided in the uppermost portion by repeating the steps (3) and (4) alternately several times;

(6) partitioning the intermediate layers placed between the light-transmitting insulation layers into the latent image layers for the hardened unit column layer which is not dissolved in the predetermined solvent and the dissolution layers which are dissolved layers which are dissolved in the predetermined solvent by exposing the laminated layers to light in a predetermined pattern;

(7) forming multiple liquid crystal injection holes of a predetermined pattern ranging from the uppermost insulation layer to the lowest dissolution layer, excluding the latent image layer for the column in the unit laminated layers;

(8) forming a cavity portion around the unit column layer by supplying the solvent from the liquid crystal injection holes and removing all the dissolution layers within the laminated layers;

(9) forming liquid crystal layer in the cavity portion by injecting the liquid crystal through the liquid crystal injection holes and sealing them; and (10) forming an upper electrode on the laminated layer in a predetermined pattern.

BRIEF DESCRIPTION OF THE DRAWINGS

The above objects and other advantages of the present invention will become more apparent by describing in detail a preferred embodiment thereof with reference to the attached drawings in which.

DETAILED DESCRIPTION OF THE INVENTION

The embodiment to be explained hereinafter is based on the aforementioned liquid crystal display device which has been previously proposed. Elements not described in detail in reference to this embodiment are described in the previously filed applications or are known to those of ordinary skill in the art. Also, a reflective type liquid crystal display device is explained in this embodiment and the disclosed embodiment is merely an example which can be realized and is not intended to limit the scope of the invention.

Figure 2:
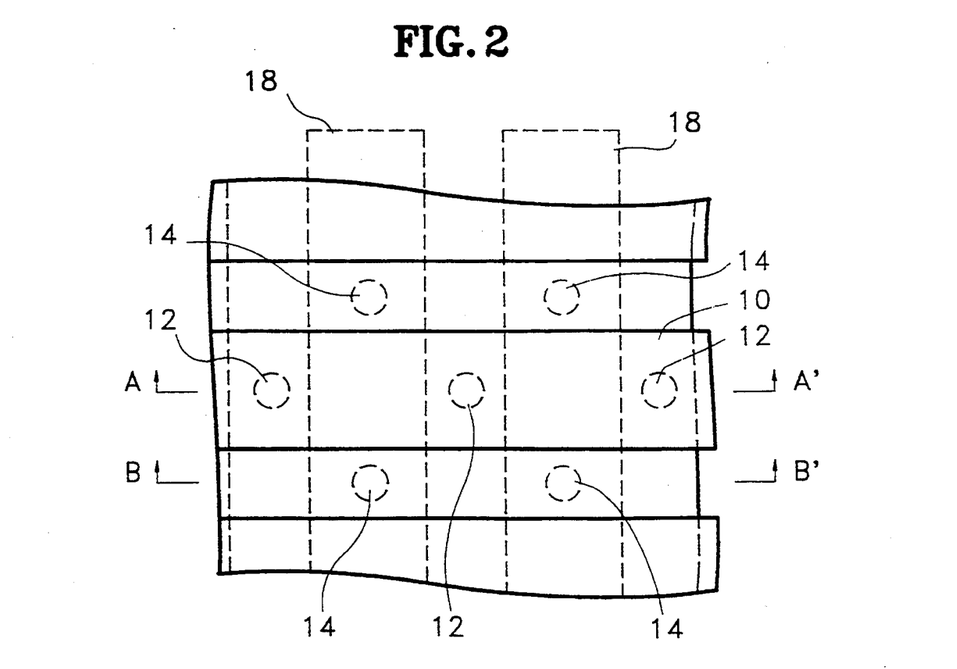
FIG. 2 is a partly extracted plan view of the reflective type liquid crystal display device shown in FIG. 1.
Figure 3:
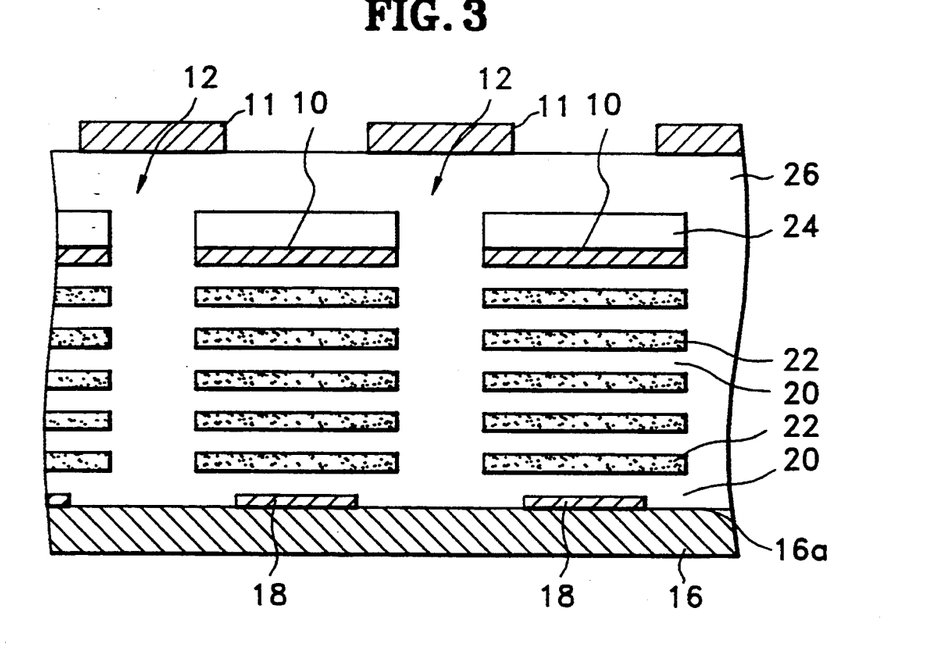
FIG. 3 is a cross-sectional view along a line A—A' of the reflective type liquid crystal display device shown in FIG. 1.
Figure 4:
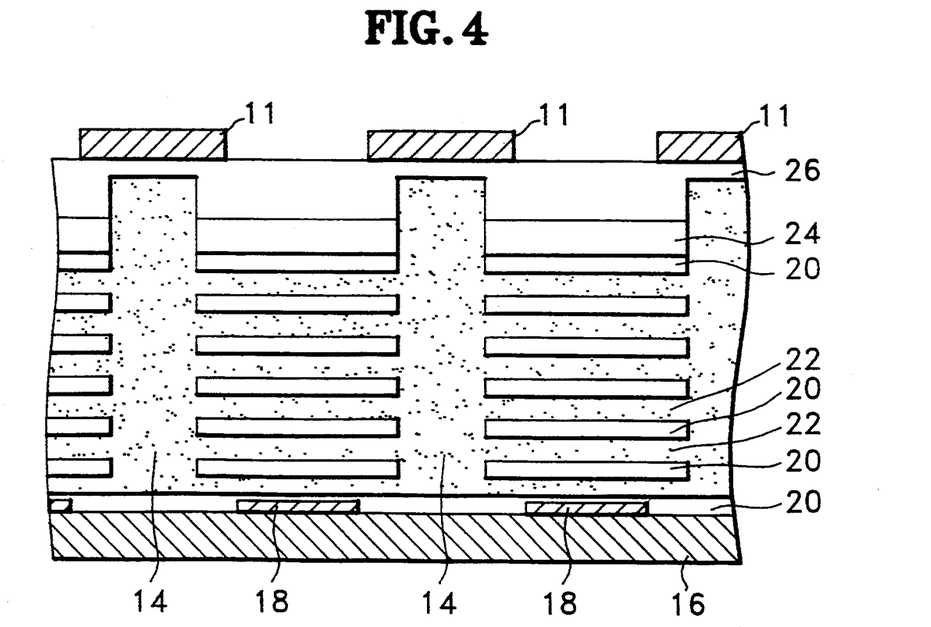
FIG. 4 is a cross-sectional view along a line B—B' of the reflective type liquid crystal display device shown in FIG. 1.
Figure 11:
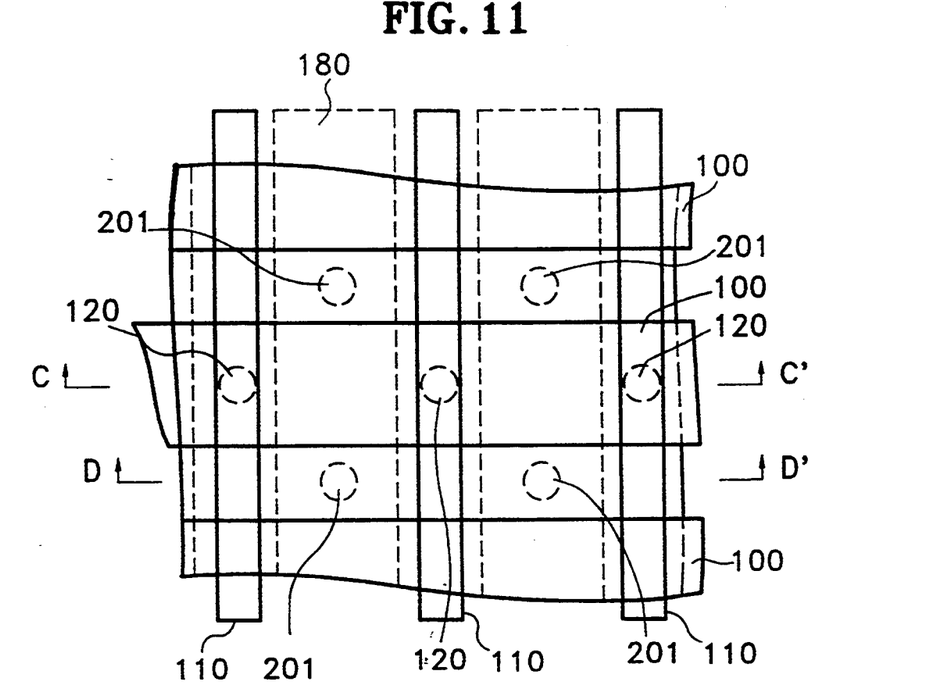
FIG. 11 is a partly extracted plan view of the liquid crystal display device according to the present invention.
Figure 12:
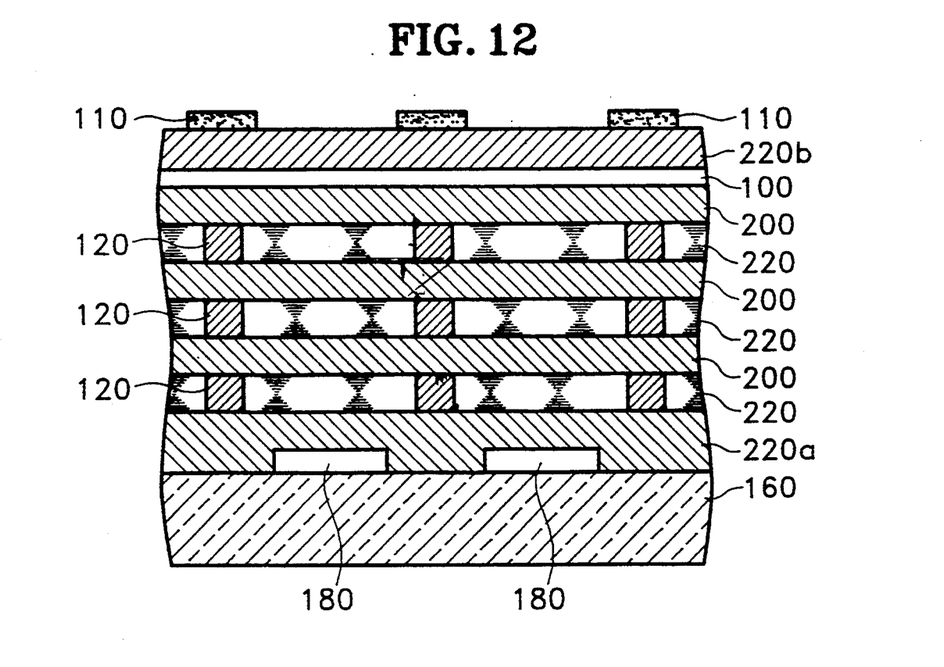
FIG. 12 is a cross-sectional view along a C—C' of the liquid crystal display device shown in FIG. 11.

Referring to FIG. 11, the liquid crystal display device according to the present invention has the same planar structure as that of the previously proposed liquid crystal display device [which has been previously proposed as] shown in FIG. 2. However, referring to FIGS. 12 and 13, it is understood that the two LCD devices have different structures relative to columns 120. Otherwise, the two LCD devices have similar elements. As shown in FIG. 12, the LCD device according to the present comprises alternating insulation layers 200 and liquid crystal layers 220. In the illustrated example, three alternating layers are shown, but more than three layers can be provided.

Figure 13:
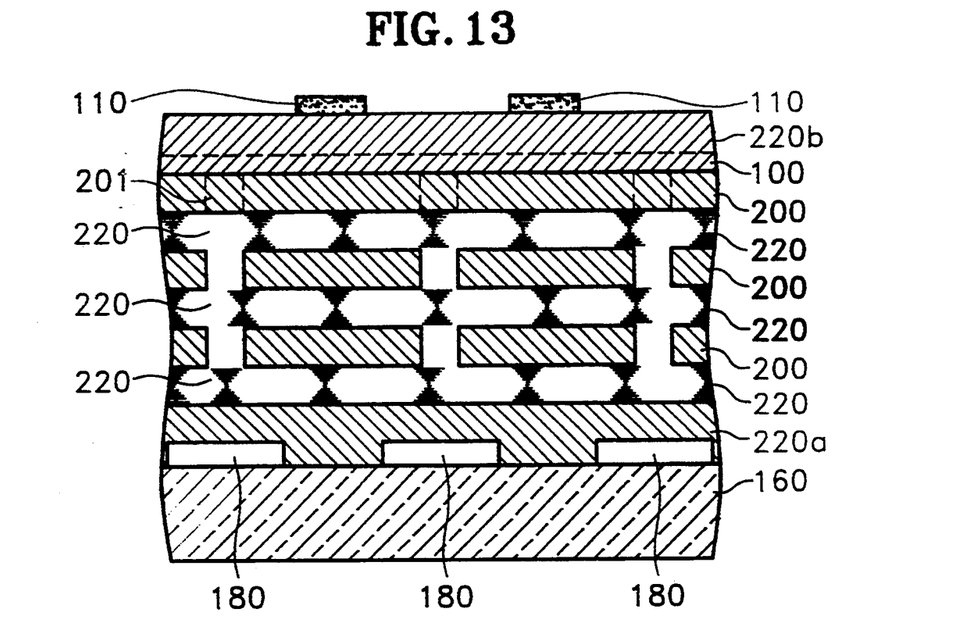
FIG. 13 is a cross-sectional view along a line D—D' of the liquid crystal display device shown in FIG. 11.

Reviewing the overall structure, first, a plurality of striped first electrodes 180 having a predetermined pattern and formed from ITO are provided on a black substrate 160 made of an epoxy resin. A photoresist in which a light-transmitting insulation layer 200 and a liquid crystal layer 220 are alternately laminated several times is provided on the upper portion of first electrodes 180. Multiple columns 120 are provided for maintaining a regular distance between respective insulation layers 200. Also, among the insulation layers 200, a light-transmitting striped second electrode 100 made of an ITO is formed in a predetermined pattern on the uppermost insulation layer 200 in correspondence with first electrodes 180. A light-transmitting resin layer 220b made of an epoxy resin or acryl resin is uniformly formed on the second electrode 100. A plurality of light-shielding layers 110 are provided over the column 120 and the light-transmitting resin layer 220b in the upper surface of injection holes 201. Here, first and second electrodes 180 and 100 are arranged in an X-Y matrix form and the location of the insulation layers 220 is fixed by the unit columns 120, as shown in FIG. 13. The unit columns constitute one overall column together with the adjacent columns provided in the upper and lower portions thereof.

In another embodiment, the unit columns are formed on a body, with several unit columns being combined sequentially, to have a striped structure in which the shielding layer is disposed in the same direction therewith. The unit columns may also have a mosaic structure such that the column and the shielding layer are disposed in the same direction. Such columns having a black color absorb the light dispersed into other pixels and thereby restrain light interference between pixels. Here, the black color is darker than that of other elements. At this time, the columns are formed of a photosensitive resin in which a black dye is dispersed up and down, a slat-additive natural protein material including casein, gelatin, glue, etc., and salt-additive polymer resin including polyvinyl alcohol (PVA), polyvinyl butyral (PVB), acryl, etc. If photosensitive resin is employed as the column layer material, it is also desirable to use a single black dye or a compound dye of at least three dyes of red, yellow and blue to obtain a black coloring. Meanwhile, the respective unit columns have mutually different colors, for example, red, yellow and blue, respectively, up and down, and thereby obtain an overall compounded black color series. With this arrangement, there should be four or more insulation layers.

Meanwhile, multiple liquid crystal injection holes 201 are provided in an area other than the light-transmitting area, that is, in an electrode-crossing area. The liquid crystal injection holes 201 are formed linearly from the light-transmitting resin layers 220b through the lower insulation layers 220. Subsequently, the liquid crystal injection holes of the light-transmitting resin layers 220b are sealed after the liquid crystal layers are filled up during the manufacturing process.

In the above structure, the liquid crystal layers 220 being of the electrical field effect type can employ a nematic liquid crystal, a cholesteric nematic transition (CNT) or a ferro-dielectric liquid crystal (FLC) using phase transitions. These substances are orderly disposed in a direction according to the presence of electrical fields, and permit light transmission or prevent light transmission by dispersing the incident light internally in accordance with the electrical field. In this arrangement, the extend to which an opaque white-turbid state is present under condition that the electric field is not formed and the light transmission is not permitted, differs according to the extent of disorder in the dispositional direction of liquid crystals.

Hereinbelow, the manufacturing method of the liquid crystal display device according to the present invention will be described with reference to FIGS. 14 through 22.

FIGS. 14 through 22 show processing states in sequence throughout the manufacturing steps of the reflective type liquid crystal display device shown in FIG. 11.

Figure 14:
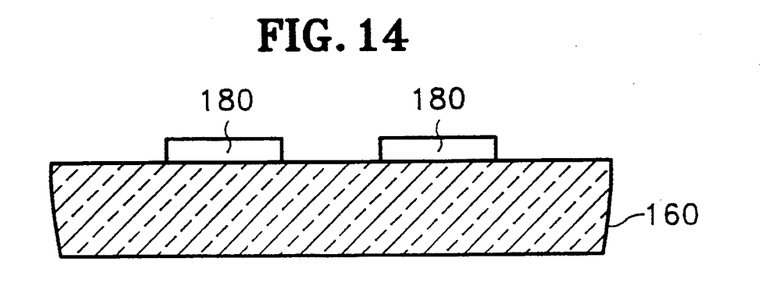
FIGS. 14 through 22 show processing states in sequence throughout the manufacturing steps of the liquid crystal display device according to an embodiment of the present invention.

(1) Referring to FIG. 14, a plurality of first electrodes 180 made of a conductive material are formed on a black plastic substrate 160 in a predetermined pattern, for example, a parallel striped pattern.

Figure 15:
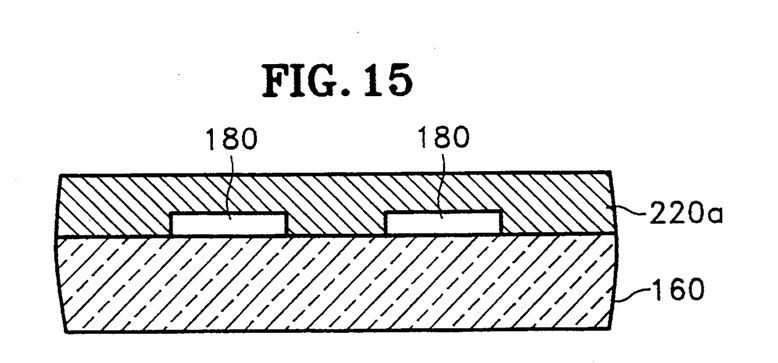

(2) Referring to FIG. 15, an insulation layer 220a is formed as a protective layer over the first electrodes 180. Insulation layer 220a is formed from a material which cannot be dissolved in a predetermined solvent, for example, polyimide, acryl, epoxy resin, etc.

Figure 16:
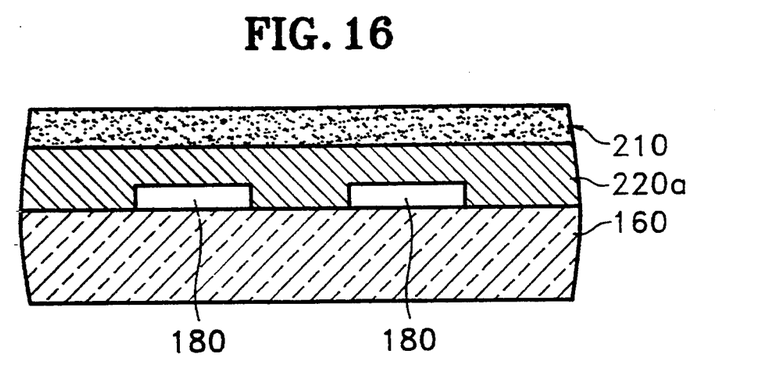
Figure 17:
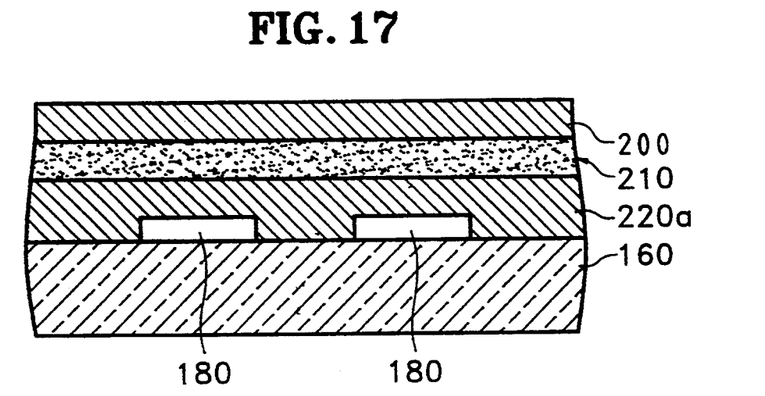

(3) Referring to FIGS. 16 and 17, a light-transmitting insulation layer 200 made of a material which cannot be dissolved in a predetermined solvent and which has stable physical properties at 180° C. or more, for example, acryl resin; polyimide or epoxy resin, and an intermediate layer 210 formed from a colored photosensitive resin made of aryl series material or PVA are formed on the surface of substrate 160 whereon the insulation layer 220a is formed. The intermediate layer 210 which is dispersed with a black color series dye for absorbing light is separated into dissolution layers and unit columns and is obtained through the successive manufacturing process. Here, the materials for the intermediate layer and the insulation layer should be selected so as to have a solubility and insolubility, respectively, for a given solvent.

Figure 18:
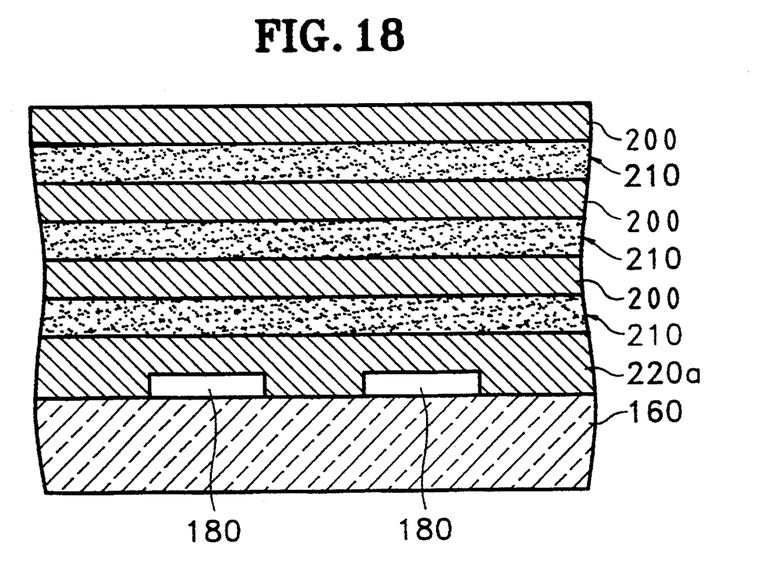

(4) Referring to FIG. 18, a plurality of laminated layers are formed by alternating the insulation layer 200 and intermediate layer 210. In the processing for the intermediate layer, a photosensitive resin in which a black dye is dispersed, a salt-additive natural protein material including casein, gelatin or glue, or a salt-additive polymer resin including polyvinyl alcohol (PVA), polyvinyl butyral (PVB) or acryl may be used. In case the photosensitive resin in which a dye is dispersed is employed as a material of the column layer, it is also desirable to use a single black dye or a compound dye of at least three dyes of red, yellow and blue, as the dye for obtaining a black coloring. Meanwhile, the coloring if a black color series compounded through the intermediate layer having mutually different colors is obtained by dividing the respective dyes of the intermediate layers into red, yellow and blue colors. At this time, the insulation layers should number four or more.

Figure 19:
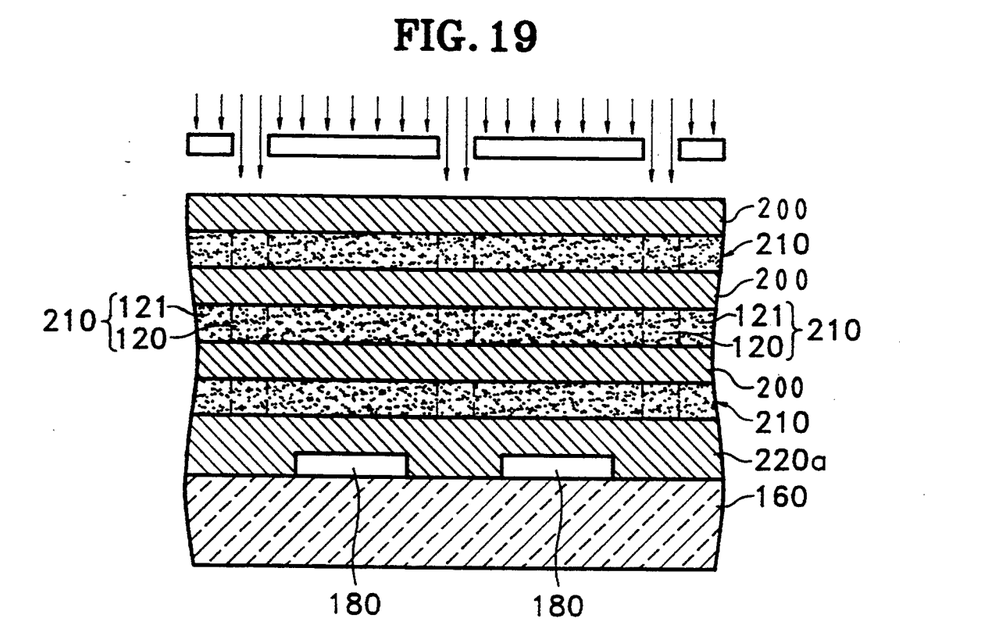

(5) Referring to FIG. 19, the intermediate layers 210 place between the light-transmitting insulation layers are partitioned into latent image layers for a hardened unit column 120 which is not dissolved by the predetermined solvent and dissolution layers 121 which are dissolved in the predetermined solvent are formed by exposing the laminated layers 200 and 210 to light in a predetermined pattern.

Figure 20:
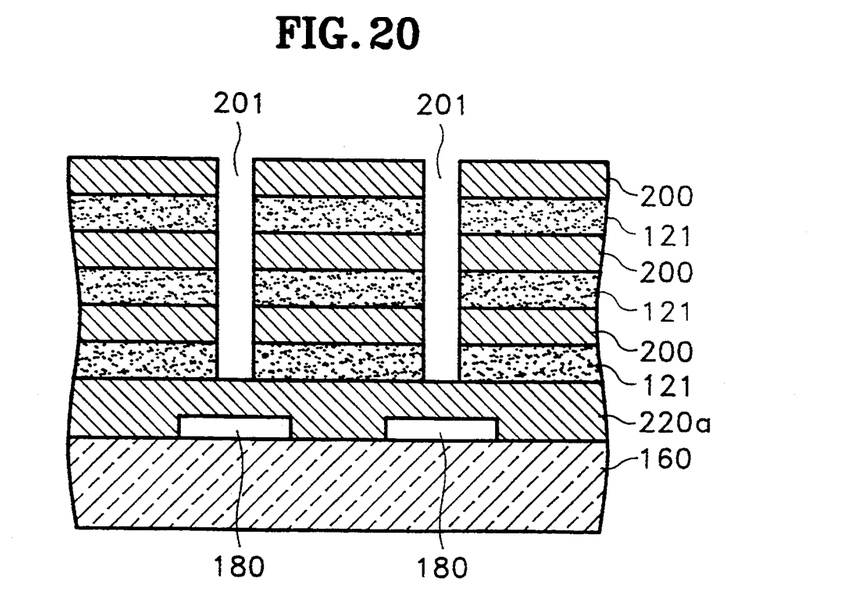

(6) Referring to FIG. 20, multiple liquid crystal injection holes 201 are formed ranging from the uppermost insulation layer to the lowest dissolution layers 121 in a predetermined pattern, excluding the latent image layers for the column in the unit laminated layers.

Figure 21:
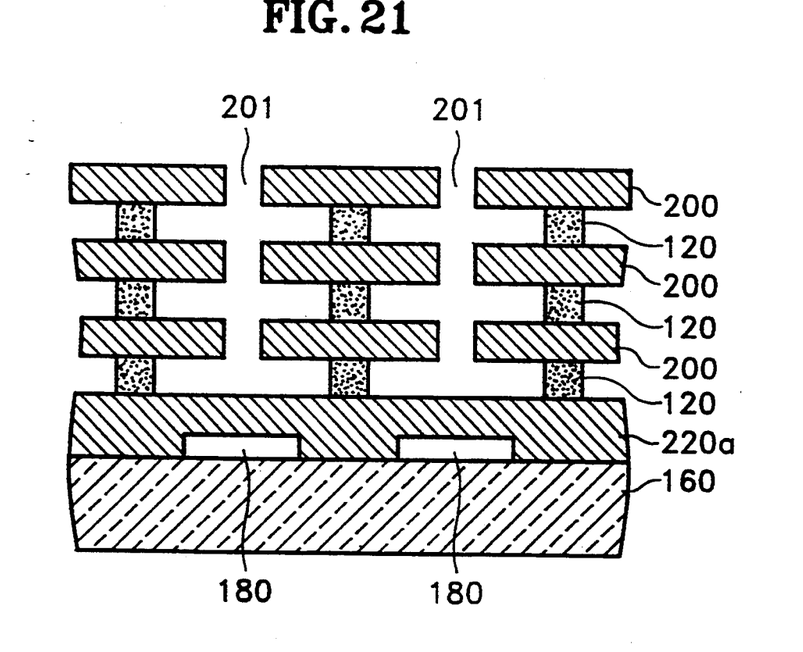

(7) Referring to FIG. 21, the latent image layers 121 of all dissolution layers within the laminated layers are removed by supplying the solvent from the liquid crystal injection holes 201 and thereby formed cavity portions around the unit column layers 120. At this time, the dissolution layers 121 are removed by supplying the solvent, for example, hydrochloride acid, to the liquid crystal injection holes 201. Accordingly, the portions where the liquid crystal injection holes 201 and the dissolution layers 121 were present become cavities, and then, the insulation layers 200 partitioning the cavities maintain a predetermined interval from one another by the latent image layers for the remaining columns 120 without being dissolved.

Figure 22:
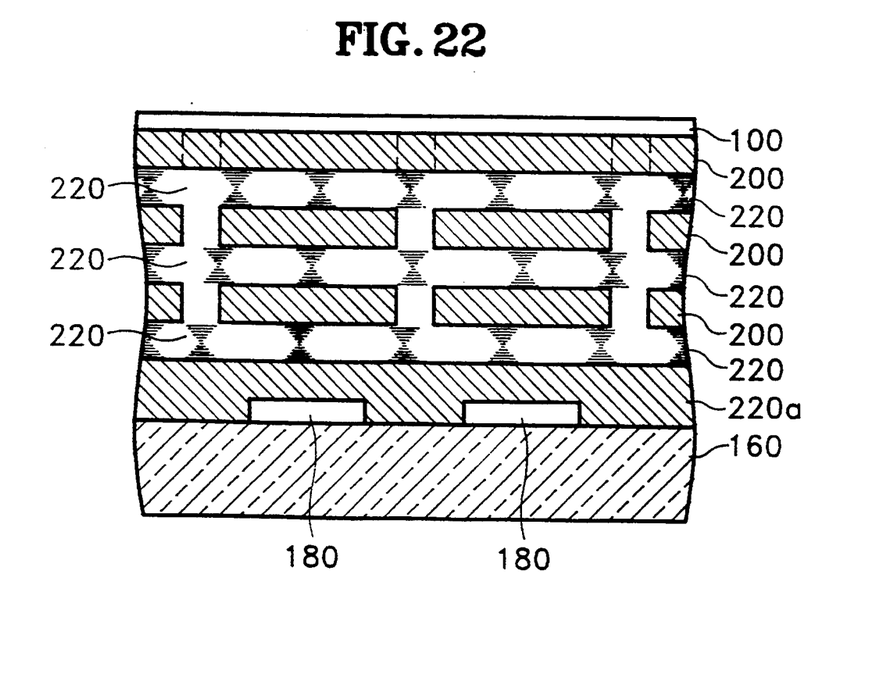

(8) Referring to FIG. 22, the liquid crystal is filled up to the cavities formed by the insulation layers by injecting liquid crystal through the liquid crystal injection holes 201 and the liquid crystal injection holes 201 are sealed to form liquid crystal layers 220 in the cavities.

Also, a second electrode plate 100 corresponding to the first electrodes 180 is formed on the uppermost insulation layer 200 in a predetermined pattern and the liquid crystal display device shown in FIGS. 11, 12 and 13 is finally manufactured by forming an insulation layer 220b and a light-shielding layer 110 for protecting the electrodes thereon.

In the liquid crystal display device and manufacturing method thereof, as described above, the intermediate layer for the columns may have a single black color series coloring but a black embodiment is possible by a color compound which makes the unit columns have red, yellow and blue colors according to the upper and lower layers, as necessary. Accordingly, in the manufacturing method according to another embodiment of the present invention, the intermediate layers for the columns are sequentially laminatedly formed by materials in which red, yellow and blue dyes are dispersed.

The manufacturing method of the present invention as described above, does not required a separate process for the columns and column portions are provided together with cavity portions in the process of dissolving the dissolution layer, by adding only a light-exposing process of a predetermined pattern. Since the dissolution layers are removed by one, time etching process, unnecessary etching processes using solvents for other elements are eliminated, thereby lessening the deterioration of product performance and quality. Also, the overall processing time is reduced. Further, since the light interference between pixels is reduced due to a black coloring of columns, a liquid crystal display device having high clarity and contrast ratio can be obtained.

What is claimed is:

1. A liquid crystal display device comprising:
   at least one substrate;
   a plurality of first electrodes disposed in a predetermined pattern on said substrate and defining multiple pixel areas;
   a protective layer overlaying said plurality of first electrodes;
   a plurality of second electrodes disposed in a predetermined pattern opposite said plurality of first electrodes;
   a liquid crystal layer disposed between said said plurality of second electrodes and said protective layer;
   one or more insulation layers provided in said liquid crystal layer, and partitioning said liquid crystal layer into multiple liquid crystal layers, each respective liquid crystal layer similarly transmitting light in response to an electrical field; and,
   columns placed in areas other than said defined pixel areas, and fixing the location of said one or more insulation layers in said liquid crystal layer;
   wherein said columns are made of a black-colored material which absorbs external light, and wherein said columns are composed of multiple unit columns sequentially placed in upper and lower portions between adjacent insulation layers with said insulation layers inserted therebetween.

2. A liquid crystal display device as claimed in claim 1, wherein said columns form a striped structure.

3. A liquid crystal display device as claimed in claim 2, further comprising:
   a light-shielding layer corresponding to said columns provided on an uppermost layer of said one or more insulation layers.

4. A liquid crystal display device as claimed in claim 2, wherein said columns comprise at least one of;

a photosensitive resin having a black dye dispersed therein, a salt-additive natural polymer resin comprising at least one of casin, gelatin, and glue, and a synthetic polymer salt-additive resin comprising at least one of polyvinyl alcohol (PVA), polyvinyl butral (PVB), and acryl.

5. A liquid crystal display device as claimed in claim 4, wherein said columns comprise a photosensitive resin having a single black dye dispersed therein.

6. A liquid crystal display device as claimed in claim 4, wherein said columns comprise a photosensitive resin having a compound dye dispersed therein, said compound dye comprising at least a red, a yellow and a blue component.

7. A liquid crystal display device as claimed in claim 2, wherein said columns comprise at least first, second, and third columns mutually and vertically adjacent one to another, and wherein said first, second and third columns are respectively have a respective color taken from a group including red, yellow and blue.

8. A liquid crystal display device as claimed in claim 1, further comprising:

a light-shielding layer corresponding to said columns provided on an uppermost layer of said one or more insulation layers.

9. A liquid crystal display device as claimed in claim 8, wherein said columns and said light-shielding layer are disposed in a same direction to form a striped structure.

10. A liquid crystal display device as claimed in claim 1, wherein said columns comprise at least one of:

a photosensitive resin having a black dye dispersed therein, a salt-additive natural polymer resin comprising at least one of casein, gelatin, and or glue, and a synthetic polymer salt-additive resin comprising at least one of polyvinyl alcohol (PVA), polyvinyl butyryl (PVB), and acryl.

11. A liquid crystal display device as claimed in claim 10, wherein said columns comprise a photosensitive resin having a single black coloring dispersed therein.

12. A liquid crystal display device as claimed in claim 1, wherein said columns comprise at least first, second and third columns mutually and vertically adjacent one to another, and wherein said first, second, and third columns have a respective color taken from a group including red, yellow and blue.

13. A manufacturing method for a liquid crystal display device comprising the steps of:

(1) forming a plurality of lower electrodes in a predetermined pattern on a substrate;

(2) forming a protective insulation layer over said plurality of lower electrodes, wherein said protective insulation layer will not dissolve in a predetermined solvent;

(3) forming an intermediate layer over said protective insulation layer, wherein said intermediate layer comprises a photosensitive resin which will not dissolve in the predetermined solvent, said photosensitive resin having a black series dye dispersed therein to absorb light;

(4) forming a light-transmitting insulation layer on said intermediate layer;

(5) repeating steps (3) and (4), wherein subsequent intermediate layers are formed over previously formed light-transmitting insulation layers to form multiple laminated layers in which an insulation layer is provided as an uppermost laminated layer;

(6) partitioning intermediate layers between said light-transmitting insulation layers into unit columns which are not dissolved by said predetermined solvent, and into dissolution layers which are dissolved by said predetermined solvent;

(7) forming multiple liquid crystal injection holes in each insulation layer from said uppermost insulation layer to a lowermost dissolution layer, excluding said unit columns in said insulation layers;

(8) forming a cavity portion around said unit columns by supplying said predetermined solvent through said liquid crystal injection holes and removing all the dissolution layers within said insulation layers;

(9) forming liquid crystal layers in said cavity portion by injecting liquid crystal through said liquid crystal injection holes; and (10) forming an upper electrode on said uppermost insulation layer in a predetermined pattern.

14. A manufacturing method for a liquid crystal display device as claimed in claim 13, wherein said column units comprise a photosensitive salt-additive natural polymer resin comprising at least one of casein, gelatin, and glue in which a black dye is dispersed.

15. A manufacturing method for a liquid crystal display device as claimed in claim 14, wherein said black dye comprises a single dye of black color.

16. A manufacturing method for a liquid crystal display device as claimed in claim 14, wherein said black dye comprises a compound dye comprising at least a red dye, a yellow dye, and blue dye.

17. A manufacturing method for a liquid crystal display device as claimed in claim 13, wherein said unit columns comprise a synthetic polymer photosensitive resin comprising at least one of polyvinyl alcohol (PVA), polyvinyl butyryl (PVB), and acryl in which a black dye is dispersed.

18. A manufacturing method for a liquid crystal display device as claimed in claim 17, wherein said black dye comprises a single dye of a black color.

19. A manufacturing method for a liquid crystal display device as claimed in claim 17, wherein said black dye comprises a compound dye comprising at least a red dye, a yellow dye, and blue dye.

* * * * *